United States Patent [19]

Irwin

[11] 4,398,003

[45] Aug. 9, 1983

[54] PROCESS FOR PREPARING THERMOSET POLYMER SPHERES

[75] Inventor: Robert S. Irwin, Lake Jackson, Tex.

[73] Assignee: The Dow Chemical Company, Midland, Mich.

[21] Appl. No.: 325,405

[22] Filed: Nov. 27, 1981

Related U.S. Application Data

[63] Continuation-in-part of Ser. No. 182,208, Aug. 28, 1980, abandoned.

[51] Int. Cl.$^3$ ............... C08G 59/16; C08G 59/00; C08F 283/10
[52] U.S. Cl. ............... 525/531; 521/62; 523/403; 523/426; 525/11; 525/25; 525/27; 525/379; 525/384; 525/922; 526/200; 526/320; 526/910; 528/303; 528/304
[58] Field of Search ............ 526/200, 320, 910; 525/11, 25, 27, 328, 379, 384, 531, 922; 528/303, 304; 521/62

[56] References Cited

U.S. PATENT DOCUMENTS

| | | | |
|---|---|---|---|
| 3,822,224 | 7/1974 | Gillan et al. | 521/62 |
| 3,879,314 | 4/1975 | Gunning et al. | 521/62 |
| 3,891,577 | 6/1975 | Kershaw et al. | 521/62 |
| 3,923,704 | 12/1975 | Gunning et al. | 521/62 |
| 3,933,579 | 1/1976 | Kershaw et al. | 521/62 |
| 4,137,380 | 1/1979 | Gunning et al. | 521/62 |
| 4,273,830 | 6/1981 | Gillan et al. | 428/364 |

Primary Examiner—John C. Bleutge
Assistant Examiner—Herbert J. Lilling
Attorney, Agent, or Firm—J. G. Carter

[57] ABSTRACT

A process for preparing thermoset polymer spheres by polymerizing a thermosettable polymer such as a vinyl ester resin or an unsaturated polyester resin in water containing a suspending agent in the presence of a catalyst and an accelerator is improved by employing an organic suspending agent as the suspending agent.

12 Claims, No Drawings

PROCESS FOR PREPARING THERMOSET POLYMER SPHERES

CROSS REFERENCE TO RELATED APPLICATION

This is a continuation-in-part of application Ser. No. 182,208 filed Aug. 28, 1980 now abandoned.

BACKGROUND OF THE INVENTION

The present invention concerns thermoset polymer spheres. Such spheres have previously been prepared employing a metal salt as the suspending agent as disclosed by Najvar in U.S. Pat. No. 3,799,903.

SUMMARY OF THE INVENTION

The present invention concerns an improved process for preparing essentially non-porous thermoset polymer beads which comprises polymerizing an aqueous suspension of an ethylenically polymerizable, thermosettable resin, said aqueous suspension comprising (1) water (2) an ethylenically unsaturated thermosettable resin, (3) a curing agent, (4) an accelerator for the curing agent and (5) a suspending agent and subsequently recovering the essentially non-porous polymer spheres therefrom; said improvement being employing an organic water soluble suspending agent in which the thermosettable resin is insoluble.

The present invention also concerns a process for preparing essentially non-porous polymer spheres which process comprises:

(1) forming two mixtures, one of which is
 (a) a solution of water and a water soluble organic suspending agent; and as the other,
 (b) a thermosettable resin containing polymerizable ethylenically unsaturated groups and a peroxygen-containing catalyst for said resin which is substantially soluble in said resin;
(2) adding one mixture to the other;
(3) stirring in the presence of an accelerator for polymerizing the said resin in the presence of the curing agent for a time sufficient to form essentially non-porous spheres of said thermosettable resin; and
(4) recovering therefrom said thermosettable spheres in a thermoset condition.

DESCRIPTION OF THE PREFERRED EMBODIMENTS

Suitable thermosettable resins which can be employed herein include, for example, vinyl ester resins and unsaturated polyester resins including mixtures thereof.

Also included in the definition of thermosettable resins are those unsaturated polymerizable resins which are admixed with copolymerizable monomers.

As defined herein, thermosettable vinyl ester resins broadly include resins prepared by reacting about equivalent proportions of an unsaturated mono-carboxylic acid and a polyepoxide. The resulting resin is characterized as having terminal polymerizable groups joined to the organic residue of said polyepoxide by

$-\overset{O}{\underset{\|}{C}}-OCH_2CHOHCH_2O-$ groups.

A typical vinyl ester resin prepared by reaction of two moles of methacrylic acid with a diglycidyl ether of bisphenol A is shown by the following formula.

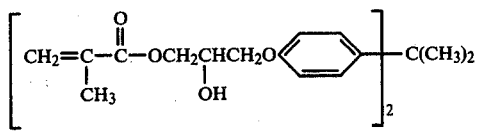

It can be seen from said formula that vinyl ester resins are chemically distinct from unsaturated polyesters which are prepared by condensing a glycol with a dibasic acid or anhydride.

The preparation of resins, herein defined as vinyl ester resins, and details as to reaction conditions, variations in proportions of reactants, choice of reactants, etc. are disclosed in U.S. Pat. Nos. 3,367,992; 3,066,122; 3,506,736; 3,179,623; 3,256,226; 3,301,743; 3,337,406; 3,446,259; 3,674,893; 3,632,861; and 3,892,819, all of which are incorporated herein by reference.

As shown in the above references a variety of polyepoxide resins may be used in the preparation of vinyl ester resins. Useful polyepoxides include polyglycidyl ethers of polyhydric phenols and polyhydric alcohols, epoxy novolac resins, epoxidized diolefins or fatty acids or drying oils provided the polyepoxide contains more than one oxirane group per molecule. The polyepoxides also include those wherein the molecular weight is increased by reaction with a difunctional compound such as a dicarboxylic acid.

Preferred polyepoxides are the polyglycidyl ethers of polyhydric phenols and polyhydric alcohols, the epoxy novolac resins and mixtures thereof wherein the epoxide equivalent weight may vary from about 150 up to about 6,000. Said polyepoxides are made by reacting at least about 2 moles of an epihalohydrin with 1 mole of a polyhydric phenol, polyhydric alcohol or novolac resin and a sufficient amount of a caustic alkali to combine with the halogen of the halohydrin. The products are characterized in having more than one epoxide group per molecule.

Unsaturated monocarboxylic acids useful in preparing vinyl ester resins include acrylic acid, methacrylic acid, halogenated acrylic or methacrylic acids, cinnamic acid, and the like mixtures thereof. Also included are the 2-hydroxyalkyl acrylate or methacrylate half esters of dicarboxylic acids as described in U.S. Pat. No. 3,367,992 wherein the hydroxyalkyl group preferably has from two to six carbon atoms. Typical half esters include the 2-hydroxyethyl acrylate half ester of maleic acid, the 2-hydroxypropyl methacrylate half ester of phthalic acid and the like. Either saturated or unsaturated dicarboxylic acid half esters may be used. Conveniently the half esters are prepared by reacting about one mole of said hydroxyalkyl acrylate or methacrylate with one mole of a dicarboxylic acid anhydride. Further details may be found in U.S. Pat. No. 3,367,992.

Suitable unsaturated polyester resins include those resins which are generally prepared by the condensation of a polycarboxylic acid with a polyhydric alcohol. In particular dibasic acids or the anhydrides thereof and glycols are the preferred reactants. The unsaturated sites in the polyester are obtained by using an unsaturated dibasic acid or anhydride. Depending on the properties desired mixtures of both saturated and unsaturated polycarboxylic acids or anhydrides are commonly used.

The unsaturated polyester is typified by a regular repeating unit in the polymer chain having a formula such as

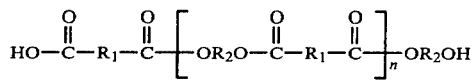

where $R_1$ represents the residual organic portion of a dicarboxylic acid, $R_2$ represents the residual organic portion of a glycol and n is an integer ranging up to 50 or 100 or even higher. Thus a polyester has a regular distribution of ester groups along the polymer chain. Moreover, if the polyester is prepared from a mixture of maleic and phthalic acids the $R_1$ groups would be a random mixture of —$CH_2$=$CH_2$— and phenyl groups along the chain. Such polyesters, their preparation and a description of a variety of acids, anhydrides, glycols etc. which may be used to prepare same are found in *Handbook of Reinforced Plastics of the SPI*, by S. Oleesky and G. Mohr, Reinhold Publishing Corporation, 1964, at pages 13–55. Since such resins and their preparation are fully described in the above book as well as in a host of patents, journals and other reference books, the details thereof need not be repeated herein.

Generally, the unsaturated polyester contains unreacted acid groups even when an excess of the glycol etc. is used. In the preparation of the resin the condensation reaction is continued until some predetermined acid number is reached. Most commercially available unsaturated polyester resins contain both free acid groups and hydroxyl groups.

Maleic anhydride and various glycols such as ethylene glycol, propylene glycol, diethylene glycol and the like are frequently used. In addition fumaric acid, itaconic acid or their anhydrides may also be used. A variety of saturated acids and anhydrides may be used in combination with an unsaturated anhydride etc. and include phthalic anhydride, isophthalic acid, tetrabromo phthalic acid, chlorendic anhydride, adipic acid and the like. It is to be understood that unsaturated polyesters prepared by replacing the glycol with an appropriate alkylene oxide, for example propylene oxide in place of propylene glycol, also are contemplated herein.

As pointed out previously, the vinyl ester resins and the unsaturated polyester resins are usually used in combination with monomers. The admixture of monomers is desirable in order to reduce the overall resin costs, but equally as important the final properties of the cured resin may be varied by the choice of the monomer and the amount used. Generally the unsaturated polymerizable resin comprises from about 30 to 80 weight percent of the mixture with the balance of about 70 to 20 weight percent comprising said monomer or mixtures of same.

A wide selection of copolymerizable monomers is available and include alkenyl aromatics, esters of acrylic or methacrylic acid, vinyl esters, vinyl acids, allyl and methallyl half esters and diesters of dicarboxylic acids, amide monomers and the like. Typical of said monomers are styrene, vinyl toluene, α-methyl styrene, halogenated styrenes such as P-chlorostyrene, alkyl substituted aromatics such as t-butyl styrene, methyl methacrylate, ethyl acrylate, butyl acrylate, cyclohexyl methacrylate, α-ethyl hexyl acrylate, octyl methacrylate, vinyl acetate, acrylonitrile, acrylic acid, methacrylic acid, acrylamide, diacetone acrylamide and the like. Divinyl monomers may also be employed.

Suitable catalysts which can be employed herein include the organic peroxides and salts of inorganic peroxides such as, for example, benzoyl peroxide, lauroyl peroxide, t-butyl hydroperoxide, t-butylperbenzoate, methyl ethyl ketone peroxide, potassium persulfate, mixtures thereof and the like. The amount of the catalyst depends upon the rate of cure desired, but generally varies from about 0.1 to about 5 percent by weight of the reactants.

Suitable accelerators which can be employed herein include the tertiary amines such as, for example, N,N-dimethyl-p-toluidine, N,N-dimethyl aniline, mixtures thereof and the like. The quantity of such accelerators likewise is dependent on the particular components and temperatures employed but is usually from about 0.1 to about 5 percent by weight of the reactants employed.

Likewise, the temperature depends upon the rate of cure desired as well as the individual components employed and any temperature at which the essentially non-porous polymer spheres are formed is suitable. Particularly suitable temperatures are from about 23° C. to about 200° C., preferably from about 23° C. to about 50° C.

While either of the two mixtures can be added to the other in the process of the present invention, it is preferable to add the resin-curing agent mixture to the water-suspending agent mixture. The accelerator can be added to either of the two mixtures at anytime prior to their admixture with each other provided the ultimate mixtures are added together prior to any substantial polymerization. In a batch process, it is preferred to add the accelerator after combining the two mixtures. In a continuous process, it is preferred to add the accelerator to one of the two streams just prior to mixing of these streams.

After recovering the beads, it is desirable to subject the beads to a temperature for a time sufficient to substantially complete polymerization of the resin and to render the beads substantially free of water. Such temperatures and times are interdependent, but 135° C. for ¾ to one hour is usually sufficient to accomplish the desired effect. However, lower temperatures for longer periods and higher temperatures for shorter periods can be employed.

The essentially non-porous polymer spheres can be employed as a drilling fluid additive as disclosed in U.S. Pat. No. 4,063,603, which is incorporated herein by reference.

Suitable suspending agents which can be employed herein include cellulose ethers such as, for example, methyl cellulose (cellulose methyl ether), hydroxypropylmethylcellulose, hydroxybutylmethylcellulose, carboxymethylmethylcellulose, mixtures thereof and the like.

The following examples are illustrative of the present invention but are not to be construed as to limiting the scope thereof in any manner.

In the following examples and comparative experiments the following components were employed.

Catalyst A is a catalyst consisting of 60% benzoyl peroxide and 40% by weight plasticizer and water which is commercially available from Witco Chemical Corporation as BZF-60.

Catalyst B is a catalyst consisting of 98.5±1% benzoyl peroxide which is commercially available from Pennwalt Corporation as LUCIDOL 98.

Catalyst C is a catalyst consisting of 50% benzoyl peroxide and 50% by weight plasticizer and water which is commercially available from Noury Chemical Company as BFF-50.

Catalyst D is a catalyst consisting of 40% benzoyl peroxide and 60% plasticizer and water which is commercially available from Noury Chemical Company as CADOX 40E.

Resin A is a vinyl ester resin containing 45 percent by weight styrene commercially available from The Dow Chemical Company as DERAKANE® 470-45.

Resin B is a vinyl ester resin containing 36 percent by weight styrene commercially available from The Dow Chemical Company as DERAKANE® 470-36.

Resin C is an unsaturated bisfumarate polyester resin containing 30 percent by weight styrene commercially available from ICI Americas, Inc. as AT-LAC® 382.

Resin D is a vinyl ester resin containing 45 percent styrene by weight commercially available from The Dow Chemical Company as DERAKANE® 411-45.

Suspending Agent A is hydroxypropylmethylcellulose available from The Dow Chemical Company.

Suspending Agent B is carboxymethylmethylcellulose.

Accelerator A is N,N-dimethyl-p-toluidine.

Accelerator B is N,N-dimethylaniline.

EXAMPLES 1-6 and COMPARATIVE EXPERIMENT

In a series of experiments, various thermosettable resins, curing agents and accelerators were employed in the following manner.

Mixture A was prepared by blending the indicated quantities of a catalyst/styrene mixture and thermosettable resin.

Mixture B was prepared by mixing the indicated suspending agent with water to form the indicated percent by weight aqueous solution of the suspending agent.

Mixture A was then added to an indicated quantity of mixture B while stirring so as to not incorporate air bubbles. After several minutes so as to permit the resultant beads to equilibrate in size, the indicated quantity of the accelerator was added. Following polymerization and exotherm, the thus formed beads were poured over the indicated screens to U.S. standard sieve designations and washed with water. The beads were then post cured at the indicated time and temperature. The quantities and results are given in the following Table I.

TABLE I

| EXAMPLE OR COMP. EXPT. NO. | MIXTURE A RESIN TYPE/GRAMS | MIXTURE A CATALYST TYPE/GRAMS | MIXTURE B SUSP. AGNT. TYPE/% SOLN./ml. | ACCELERATOR TYPE/ml. | EXOTHERM TEMP., °C. | STIRRING SPEED RPM |
|---|---|---|---|---|---|---|
| 1 | A/100 | A/3.3[1] | A/0.25/200 | A/0.2 | 41 | 150 |
| A* | B/100 | A/3.3[1] | None/0/200 | A/0.3 | ND | 500 |
| 2 | C/100 | A/3.3[1] | A/0.25/200 | A/0.5 | 38 | ND |
| 3 | A/100[3] | B/3[1] | A/0.25/200 | A/0.5 | ND | 150 |
| 4 | B/100[4] | C/2 | B/0.5/200 | Z/0.5 | ND | 200 |
| 5 | A/100 | B/3 | A/0.25/200 | A/0.2 | 37 | ND |
| 6 | A/100 | B/3 | A/0.25/200 | B/0.2 | 45 | 150 |

| EXAMPLE OR COMP. EXPT. NO. | SCREENING MESH SIZE/QUANT. | CURING & DRYING °C./MIN. | PARTICLE SIZE, MICRONS AVERAGE/RANGE | DENSITY g/cc | SOFTENING POINT, °C. |
|---|---|---|---|---|---|
| 1 | 12-100/93.3 g | 135/80 | ND[5] | ND | 146-147 |
| A* | ND | ND | Chunks[2] | ND | ND |
| 2 | 12-100/75.2 g | 110/60 | ND | ND | 104-105 |
| 3 | 12-100/94 g | 135/90 | ND | ND | 140-142 |
| 4 | ND | 110/60 | ND | 1.212 | ND |
| 5 | 12-100/94.6 g | 135/75 | ND | ND | 147-148 |
| 6 | 12-100/96.4 g | 135/60 | ND | ND | 142-143 |

*comparative

FOOTNOTES FOR TABLE

[1] Catalyst was dissolved in 3.3 g of styrene for a total addition of 3 grams plus the indicated grams of catalyst.
[2] Chunks of resin was retained on a 100 mesh screen which under a 15× microscope revealed the chunks to be agglomerated beads.
[3] The resin also contained 5 grams of acrylic acid for a total of 105 grams.
[4] The resin additionally contained ten grams of bentonite clay as a filler.
[5] ND = Not determined.

COMPARATIVE EXPERIMENT B 5 g of a 50/50 mixture of Catalyst A and styrene were dissolved in 100 g of Resin D. The 20 g of $CaCO_3$ were mixed thoroughly into the resin. This resin mixture was then poured into 100 cc of water with vigorous stirring at 1000 RPM. After about 15 minutes, polymerization and exotherm occurred. The final product, after being washed with water, was very sticky. After air drying overnight, many of the beads were stuck together but could be broken apart. They were then placed in a 110° C. oven to dry and post cure for two hours. The results are given in Table II.

EXAMPLE 6

5 g of a 50/50 mixture of Catalyst A and styrene were dissolved in 100 g of Resin D. The catalyzed resin was then poured into 100 cc of 0.25% Suspending Agent A in water with mild stirring. Soon afterward, 0.4 g of N,N-dimethyl aniline was added to accelerate the polymerization. When the polymerization and exotherm were complete, the beads were washed several times with water then dried and post cured at 110° C. for two hours. The results are given in Table II.

COMPARATIVE EXPERIMENT C 3.8 of Catalyst D were dissolved in 100 g of Resin A. Then 20 g of calcium carbonate were added and mixed well. 100 cc of water were added with stirring. Soon after this, 0.4 g of N,N-dimethyl aniline were added to promote the polymerization. Within ~5 minutes polymerization had occurred. Part of the resin hardened into a solid chunk but there were beads present. These beads were washed with water, dried and post cured at 155° C. for two hours. The results are given in Table II.

EXAMPLE 7

3.8 g of Catalyst D were dissolved in 100 g of Resin A. The catalyzed resin was then poured into 100 cc of 0.25% Suspending Agent A in water with mild stirring. Soon afterward, 0.4 g of N,N-dimethyl aniline were added to accelerate the polymerization. After the polymerization and exotherm, the beads were washed with water, dried and post cured at 155° C. for two hours. The results are given in Table II.

TABLE II

| EXAMPLE OR COMP. EXPT. NO. | PHYSICAL DESCRIPTION | SOFTENING POINT °C. | CRUSH STRENGTH kg |
| --- | --- | --- | --- |
| B* | odd shaped, non-spherical | 51 | 5–7 |
| 6 | spherical | 104 | flattens** |
| C* | odd shaped, non-spherical | 147 | 4–5 |
| 7 | spherical | 148 | 5–6 |

*comparative
**does not fracture when crushed.

I claim:

1. In a process for preparing essentially non-porous thermoset polymer beads which comprises polymerizing an aqueous suspension of an ethylenically polymerizable, thermosettable resin, said aqueous suspension consisting essentially of (1) water (2) an ethylenically unsaturated thermosettable resin selected from vinyl ester resins or mixture of such resins, (3) a catalyst, (4) an accelerating quantity of an accelerator for the catalyst and (5) a suspending agent and subsequently recovering the essentially non-porous polymer spheres therefrom; the improvement which comprises employing an organic water soluble suspending agent in which the thermosettable resin is insoluble; wherein said vinyl ester resin is prepared by reacting a polyepoxide or mixture of polyepoxides and (a) unsaturated monocarboxylic acid, (b) unsaturated dicarboxylic acid half ester or (c) mixtures thereof; and wherein the quantity of component (4) is from about 0.1 to about 5 percent by weight of component (2).

2. The process of claim 1 wherein the suspending agent is a cellulose ether.

3. The process of claim 2 wherein the suspending agent is methylcellulose, hydroxypropylmethylcellulose, hydroxybutylmethylcellulose or mixture thereof.

4. The process of claim 3 wherein the catalyst is an organic peroxide and the accelerator is N,N-dimethyl-p-toluidine, N,N-dimethyl aniline or mixtures thereof.

5. The process of claim 4 wherein the catalyst is benzoyl peroxide and the suspending agent is hydroxypropylmethylcellulose.

6. A process for preparing essentially non-porous polymer spheres which process comprises
    (1) forming two mixtures, one of which is
        (a) a solution of water and a water soluble organic suspending agent; and as the other,
        (b) a thermosettable resin selected from vinyl ester resins or mixture of such resins containing polymerizable ethylenically unsaturated groups and a peroxygen-containing catalyst for said resin which is substantially soluble in said resin;
    (2) adding one mixture to the other;
    (3) stirring, in the presence of an accelerating quantity of an accelerator for polymerizing said resin in the presence of said catalyst, for a time sufficient to form essentially non-porous spheres of said thermosettable resin; and
    (4) recovering therefrom said thermosettable spheres in a thermoset condition; wherein said vinyl ester resin is prepared by reacting a polyepoxide or mixture of polyepoxides and (a) unsaturated monocarboxylic acid, (b) unsaturated dicarboxylic acid half ester or (c) mixtures thereof; and wherein the quantity of said accelerator is from about 0.1 to about 5 percent by weight of said thermosettable resin.

7. The process of claim 6 wherein in step 2, mixture (a) is added to mixture (b).

8. The process of claim 7 wherein the recovered spheres are dried and fast cured at a temperature and for a time sufficient to substantially fully polymerize the resin and render the beads substantially free of water.

9. The process of claim 6, 7 or 8 wherein the suspending agent is a cellulose ether.

10. The process of claim 9 wherein the suspending agent is methylcellulose, hydroxypropylmethylcellulose, hydroxybutylmethylcellulose carboxymethylmethylcellulose or mixture thereof.

11. The process of claim 10 wherein the catalyst is an organic peroxide and the accelerator is N,N-dimethyl-p-toluidine, N,N-dimethyl aniline or mixtures thereof.

12. The process of claim 11 wherein the catalyst is benzoyl peroxide and the suspending agent is hydroxypropylmethylcellulose or carboxymethylmethylcellulose.

* * * * *